United States Patent [19]

Humburg

[11] Patent Number: 5,743,466
[45] Date of Patent: Apr. 28, 1998

[54] HEATING SYSTEM ESPECIALLY FOR MOTOR VEHICLES

[75] Inventor: Michael Humburg, Göppingen, Germany

[73] Assignee: J. Eberspächer GmbH & Co., Esslingen, Germany

[21] Appl. No.: 565,681

[22] Filed: Nov. 30, 1995

[30] Foreign Application Priority Data

Dec. 23, 1994 [DE] Germany ............................ 44 46 152.6

[51] Int. Cl.[6] .................................................. B60H 1/02
[52] U.S. Cl. ................................. 237/12.3 B; 237/2 A
[58] Field of Search ............................ 237/12.3 B, 2 A

[56] References Cited

U.S. PATENT DOCUMENTS

| | | | |
|---|---|---|---|
| 4,718,600 | 1/1988 | Adam | 237/2 A |
| 5,014,520 | 5/1991 | Omer et al. | |
| 5,048,752 | 9/1991 | Hintennach et al. | 237/2 A |
| 5,123,594 | 6/1992 | Humburg | 237/2 A |
| 5,174,254 | 12/1992 | Humburg | 123/142.5 R |
| 5,564,627 | 10/1996 | Veitenhansl | 237/12.3 B |

FOREIGN PATENT DOCUMENTS

| | | |
|---|---|---|
| 0 403 941 A2 | 12/1990 | European Pat. Off. . |
| 1 935 840 | 3/1970 | Germany . |
| 42 29 608 C1 | 8/1993 | Germany . |
| 4324371C2 | 8/1995 | Germany . |
| WO 94/20321 | 9/1994 | WIPO . |

*Primary Examiner*—Henry A. Bennett
*Assistant Examiner*—Derek S. Boles
*Attorney, Agent, or Firm*—McGlew and Tuttle

[57] ABSTRACT

A heat exchanger (1) acting in the manner of a radiator can be thermally coupled with a first heat source (internal combustion engine 2) and/or with a second heat source (burner 3 which can be operated independently from the internal combustion engine) via a fluidic heat carrier circuit, especially a water circuit. In addition to other parameters, the temperature of the first heat source can also be taken into account in the control of the heat carrier circuit by thermal setting elements (13).

14 Claims, 3 Drawing Sheets

HEATING SYSTEM ESPECIALLY FOR MOTOR VEHICLES

FIELD OF THE INVENTION

The present invention pertains to a heating system, which is intended especially for motor vehicles, and in which a heat exchanger acting in the manner of a radiator can be thermally coupled via a fluidic heat carrier circuit, especially a water circuit, with a first heat source, especially an internal combustion engine used to drive the vehicle and/or an additional heat source, especially a burner which can be operated independently from the vehicle engine, and in which a valve arrangement can be switched over, depending on the operating state of the first heat source, between a first state, in which the heat carrier medium or at least a large part of same is passed via both heat sources, and a second state, in which the heat carrier medium is led at least essentially only via the second heat source, according to Patent No. P 43 24 371.1-16.

BACKGROUND OF THE INVENTION

In such a heating system of a motor vehicle with internal combustion engine, which has been known from DE 42 29 608 C1, the cooling water of the internal combustion engine, which is used as the heat carrier medium, can be effectively sent to the heat exchanger of the heating system only when a cooling water pump associated with the internal combustion engine generates a higher pressure, because pressure is continuously admitted to the valve arrangement by a valve spring against the pressure of the cooling water pump in the direction of the second state, in which only the second heat source, i.e., the burner, is coupled thermally with the heat exchanger. Since the cooling water pump typically operates hydrodynamically and it runs at a higher or lower speed depending on the speed of the internal combustion engine, the cooling water pressure changes very greatly with the speed of the engine. This means that the engine is practically uncoupled from the heat exchanger at low speed. Thus, the engine is no longer able to contribute to the heating of the vehicle at idle.

SUMMARY AND OBJECTS OF THE INVENTION

It is an object of the present invention to make possible an improved utilization of the heat of the first heat source in a heating system of the type described in the introduction.

This object is accomplished according to the present invention by the valve arrangement having a thermal working or setting element, which is thermally coupled with the heat carrier medium of the first heat source and sets the first state above a threshold value of the temperature of the heat carrier medium or facilitates or releases the setting of this state.

The present invention is based on the general idea of detecting the temperature of the heat carrier medium of the first heat source and taking it into account at least as an additional parameter in the control of the valve arrangement.

It can thus be guaranteed according to a preferred embodiment of the present invention that the first heat source is always connected or remains connected to the heat carrier circuit with the heat exchanger at a sufficient temperature. The second heat source needs to be put into operation only in the case of an insufficient thermal output of the first heat source. The uniformity of the heating capacity of the heat exchanger is also increased by avoiding unnecessary thermal uncouplings of the first heat source, and the residual heat of the first heat source, e.g., the residual heat of a stopped internal combustion engine, can also be effectively utilized if desired.

Any thermal working or setting elements may, in principle, be used for the present invention.

However, purely mechanically operating thermal setting elements, which consist of a material characterized by a pronounced, temperature-dependent, reversible change in shape, are preferred because of their simplicity of design. These are especially bimetal working elements and especially preferably working elements made of a shape memory material, especially a shape memory alloy (SMA).

The working elements made of shape memory alloy may be wound, e.g., in the manner of helical compression springs made of a wire consisting of a shape memory alloy and be designed such that they have a short length below a transition temperature zone and a great length above this transition temperature zone, or a high compressive stress when they are maintained in their shortened state by constraining forces above the transition temperature zone. It is thus possible to set the valve arrangement into a desired state or to keep it in that state by means of such "springs" by increasing the temperature above the transition temperature zone or reducing it below the transition temperature zone.

According to an especially advantageous embodiment of the present invention, the valve arrangement is controlled by fluidic forces in the system of the heat carrier medium, on the one hand, and a temperature-dependent control, which is brought about by thermal setting elements, is superimposed to this fluidic control, on the other hand.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
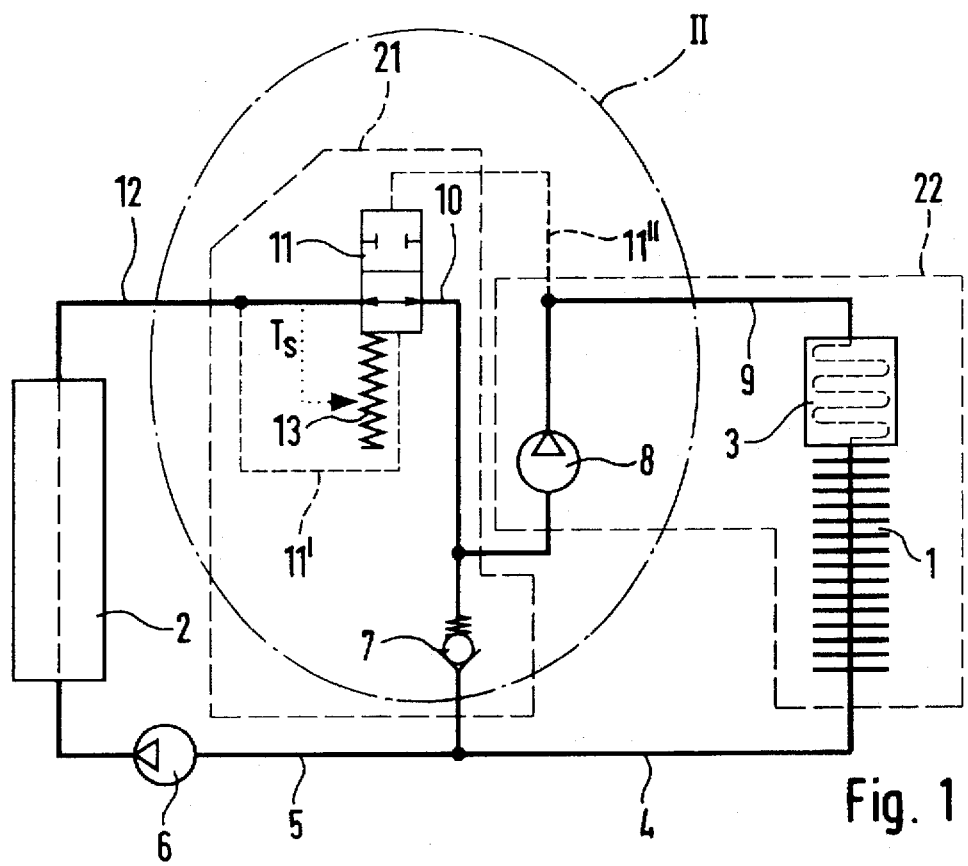
FIG. 1 is a circuit diagram-like representation of a preferred embodiment of the heating system according to the present invention.

A heat exchanger 1, which acts as a radiator and is used to heat an interior space of a vehicle, not shown, and may be arranged for this purpose in the air flow of a blower, not shown, can be thermally coupled via a water circuit, whose water is used as the heat carrier medium, with an internal combustion engine 2, which is used to drive the vehicle and forms a first heat source, and/or with a burner 3, which can be operated independently from the internal combustion engine 2 and forms a second heat source.

The heat exchanger 1 within the water circuit is connected for this purpose by its outlet line 4 to a return line 5, which is connected to the intake side of a first water pump 6, which is connected to the engine on the pressure side. The return line 5 is also connected via a non-return valve 7, which is to prevent flow in the direction of the return line 5, to the intake side of a second water pump 8, which is connected on the pressure side, via an inlet line 9, to the water inlet of the burner 3, whose water outlet is connected to the inlet of the heat exchanger 1. The outlet connection 10 of a shut-off valve 11, whose inlet is connected to a water outlet of the internal combustion engine via a flow pipe 12, is connected between the non-return valve 7 and the intake side of the second water pump 8.

The shut-off valve 11 is controlled by pressure differences in the water system. The control body of the shut-off valve 11, which is schematically represented as a slide valve, is forced for this purpose by the pressure in the flow pipe 12 or at the inlet of the shut-off valve 11 in the direction of its open position shown, and by the pressure of the pressure side of the second water pump 8 into the closed position. This is indicated by broken control lines 11' and 11". In addition, the control body of the shut-off valve 11 cooperates with a thermal working or setting element 13, which is designed in the manner of a helical compression spring and is made of a shape memory alloy. This element 13 is thermally coupled with the water in the flow pipe 12 or at the inlet of the shut-off valve 11. The element 13 seeks to assume a stretched shape above a transition temperature $T_s$, so that it seeks to hold the control body of the shut-off valve 11 in the open position shown or to bring it into that position. During cooling to below the transition temperature $T_s$, the element 13 passes over into a shortened state, so that it is no longer able to force the control body of the shut-off valve 11 into its open position or to offer any appreciable resistance to a switch-over into the closed position.

The system shown in FIG. 1 operates as follows:

It is first assumed that the first water pump 6 is not running and a temperature which is markedly below the transition temperature $T_s$ is present at the working or setting element 13 of the shut-off valve 11; the second water pump 8 shall be put into operation. In this operating state, the water pressure on the pressure side of the second water pump 8 and consequently also the water pressure in the control line 11" are considerably higher than the water pressure in the flow pipe 12 or at the inlet of the shut-off valve 11 as well as in the control line 11'. In addition, the element 13 is unable to generate any force which would force the control body of the shut-off valve 11 into the open position at the temperature indicated. The shut-off valve 11 is correspondingly set hydraulically into the closed position (not shown in FIG. 1) or is held in the closed position. The second water pump 8, which is in the feed operation, thus maintains a "small" water circuit, which leads from the pump 8 to the intake side of the pump 8 via the burner 3 and then the heat exchanger 1 as well as the non-return valve 7.

When the first water pump 6, which is typically designed as a hydrodynamic pump, is now additionally put into operation and it is running at a sufficiently high speed, such that a water pressure which is greater than the water pressure on the pressure side of the second water pump 8 and the pressure in the control line 11" is built up in the flow pipe 12 and consequently also in the control line 11', the shut-off valve 11 switches over into the open position shown in FIG. 1 even when a temperature markedly lower than the transition temperature $T_s$ continues to be present at the element 13. The two pumps 6 and 8 now maintain a "large" water circuit, which leads to the engine 2 via the internal combustion engine 2, the shut-off valve 11, the second pump 8, the burner 3, the heat exchanger 1, as well as the first pump 6. The heat of the internal combustion engine 2 and, with simultaneous operation of the burner 3, also the heat of the burner can thus be used for heating purposes. The heat generated by the burner 3 may also be used to heat the engine more rapidly if the engine is colder.

Depending on the pressure ratio of the pumps 6 and 8, "pressure-dependent" intermediate positions of the valve 11 can be set, i.e., the valve 11 controls the throughput of water at the heat exchanger 1 as well as at the engine 2 corresponding to its position.

If the engine 2 is running at a low speed and the first water pump 6 driven by it is also running at a correspondingly low speed, the water pressure in the flow pipe 12 as well as in the control line 11' regularly remains lower than the water pressure on the pressure side of the other pump 8 as well as in the control line 11". Should the water temperature at the element 13 be higher than the transition temperature $T_s$, the element 13 seeks to expand, as a consequence of which it forces the control body of the shut-off valve 11 into the open position shown in FIG. 1 or holds it in that position with a stronger force, despite the fact that the water pressure in the control line 11' is lower than the water pressure in the control line 11". If the engine 2 is sufficiently warm, it is consequently not uncoupled from the heat exchanger 1 even when the first water pump 6 is not operating effectively and the water pressure in the flow pipe 12 or in the control line 11' remains low.

To ensure that the element 13 "notices" the heat of the engine 2 under any circumstances, provisions may be made to ensure that the shut-off valve 11 will have a certain transmissibility even in the closed position and thus it functionally corresponds to a throttling section. A weak residual flow of water from the engine 2 through the shut-off valve 11 is thus always maintained during the operation of the second water pump 8, as a consequence of which the water temperature of the engine 2 acts on the element 13 even when the element 13 or the shut-off valve 11 is arranged at a great distance from the engine 2.

When the engine is cooled and a temperature markedly below the transition temperature $T_s$, is present at the element 13, the shut-off valve 11 is actuated only corresponding to the pressure differences between the control lines 11' and 11", i.e., the shut-off valve 11 can open only when the first water pump 6 generates a higher water pressure in the flow pipe 12 as well as in the control line 11'.

Figure 2:
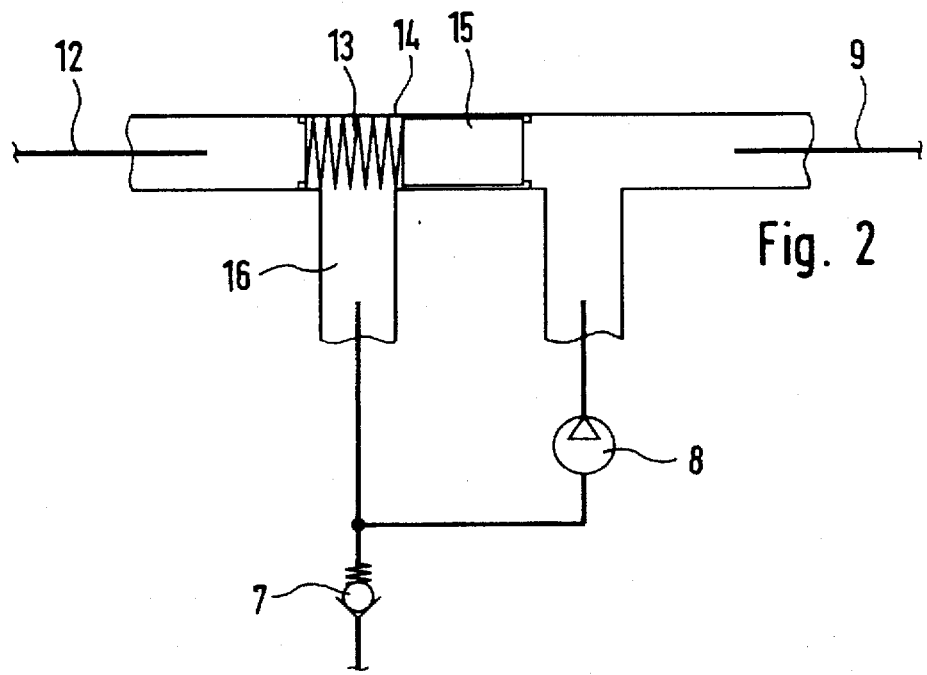
FIG. 2 is a schematic representation of the design of an advantageous embodiment of the partial system II in FIG. 1.

According to FIG. 2, the shut-off valve may have, in principle, a very simple design. A piston 15, which closes off the flow pipe 12 and the inlet line 9 against each other, is arranged displaceably between two end positions within a pipe or channel 14, which pipe or channel forms a coaxial extension of the flow pipe 12 and is extended by an inlet line 9 which is coaxial to it. This piston 15 is forced into its end position which is the right-hand end position in FIG. 2, by the thermal working or setting element 13, which is arranged within the pipe or channel 14 and is designed as a helical compression spring, as soon as the element 13 has a temperature above the transition temperature $T_s$. A pipe or channel 16, whose opening into the pipe or channel 14 is open when the piston 15 assumes its end position which is the right-hand end position in FIG. 2, is branched off laterally from the pipe or channel 14. In contrast, the piston 15 completely or practically completely covers the said opening in the left-hand end position, so that the pipe or channel 16 is completely or almost completely closed against the pipe or channel 14.

In this design, the left-hand end of the pipe or channel 14 forms the inlet of the shut-off valve 11 as well as the control line 11' according to FIG. 1. The right-hand end of the pipe or channel 14 functionally corresponds to the control line 11" in FIG. 1. The pipe or channel 16 forms the outlet of the shut-off valve 11.

The function of the shut-off valve 11 is thus the same as it was explained on the basis of FIG. 1, because the piston 15 is controlled in FIG. 2 by the pressure differences between the water pressures at the inlet of the valve 11 as well as on the pressure side of the pump 8, on the one hand, and in the inlet line 9, on the other hand, and by the temperature-dependent force of the spring 13.

Figure 3:
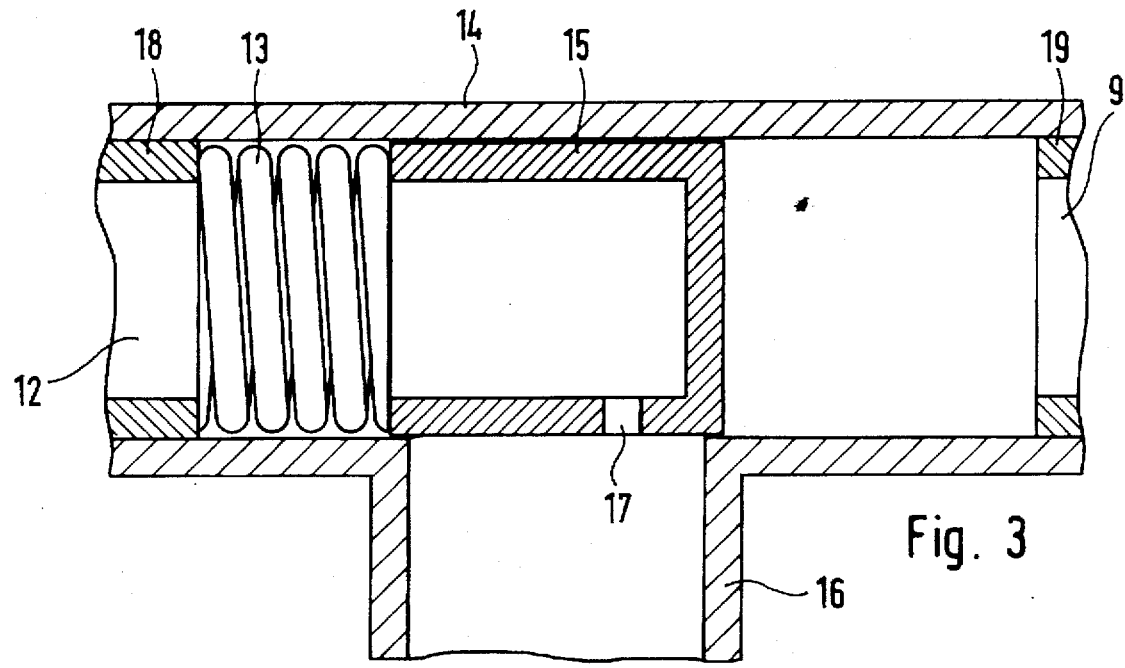
FIG. 3 is a sectional representation of an advantageous embodiment of a shut-off valve in the closed state.
Figure 4:
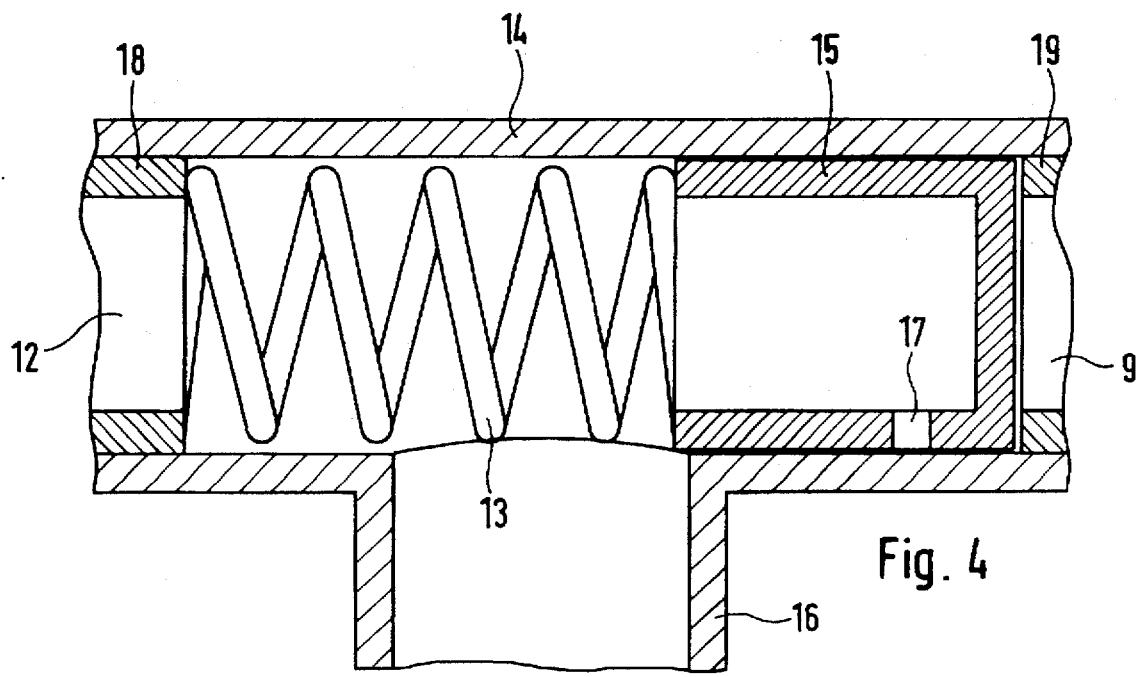
FIG. 4 is a sectional representation of the valve of FIG. 3 in the open state.

According to FIGS. 3 and 4, the piston 15 may have a cup-shaped design, and its open front end may face the inlet of the valve 11 or the flow pipe 12. It is achieved due to a radial throttling hole 17 in the circumferential wall of the piston 15 that a throttled residual flow from the flow pipe 12 to the pipe or channel 16 and consequently to the second water pump 8 (cf. FIGS. 1 and 2) still remains possible even in the closed position of the shut-off valve 11 shown in FIG. 3.

The helical spring-like thermal working or setting element 13 is arranged between the facing front wall of a sleeve 18, which is arranged stationarily as a fixed spring abutment in the pipe or channel 14, and the facing front edge of the piston 15, and the element 13 is compressed between the piston 15 and the sleeve 18 into a block in the left-hand end position of the piston 15, and it is pressed against the sleeve 18. The right-hand end position of the piston 15 is limited by another sleeve 19, which is stationarily arranged in the pipe or channel 14.

The element 13 has good contact with the water of the engine 2 flowing in through the flow pipe 12 in all positions of the piston 15, so that good thermal coupling between the element 13 and the water is guaranteed, and the element 13 is able to operate effectively as a thermal setting element.

Figure 5:
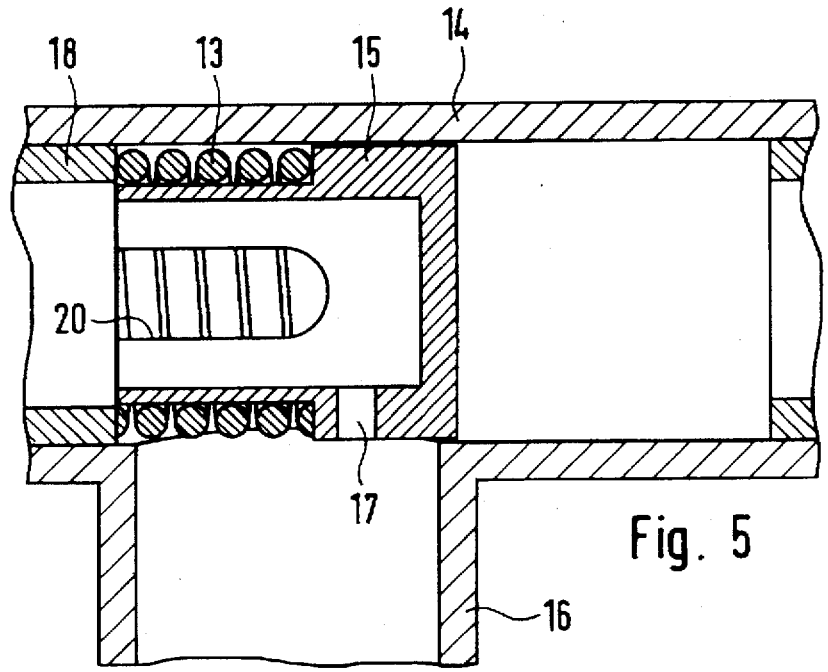
FIG. 5 is a sectional representation of a modified embodiment of the shut-off valve in the closed state.
Figure 6:
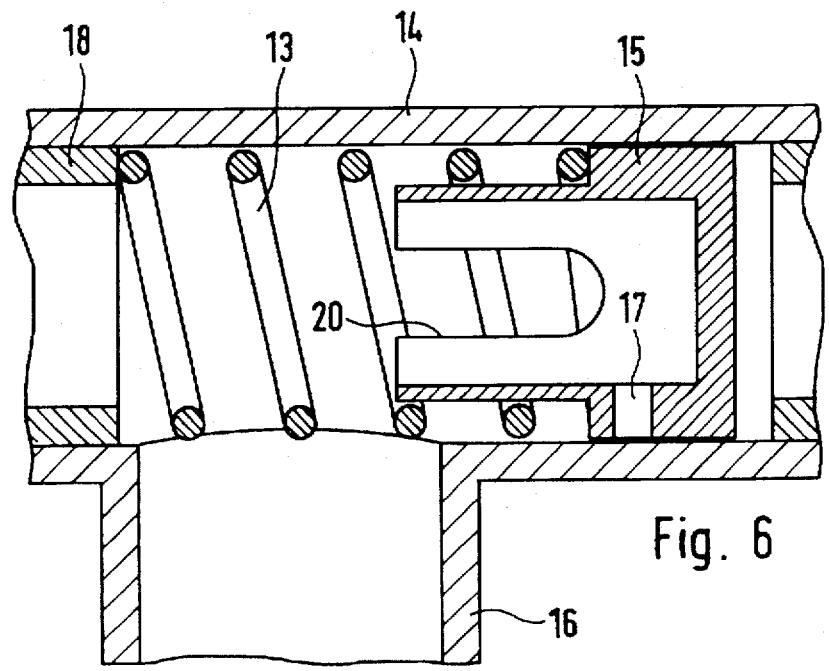
FIG. 6 is a sectional representation of the open position of the valve of FIG. 5.

The embodiment shown in FIGS. 5 and 6 differs from the embodiment according to FIGS. 3 and 4 first by the fact that the circumferential wall of the piston 15 has an outside annular shoulder, such that the end of the piston 15, which is the left-hand end in FIGS. 5 and 6, has a reduced external diameter. This annular shoulder is used as a piston-side stop or piston-side abutment of the helical compression spring-like working or setting element 13, whose other end in turn cooperates with the sleeve 18, which extends, however, into the immediate vicinity of the pipe or channel 16 in the example according to FIGS. 5 and 6. Moreover, the left-hand end of the piston 15 cooperates with the sleeve 18 in the manner of a stop in the closed position shown in FIG. 5, and the sleeve 18 can also assume the function of a seat for the piston 15 in the closed position of the said piston according to FIG. 5 and it can also sealingly cooperate with the facing piston edge.

To guarantee a good thermal coupling between the element 13 and the water in the flow pipe 12 or in the interior of the piston 15 especially in the closed position of the piston 15 according to FIG. 5, the piston has, in the example shown, axial slots 20, which are open toward the left-hand end of the piston and are dimensioned such that only a throttled connection path is maintained between the flow pipe 12 and the pipe or channel 16 in the closed position of the piston 15. The throttling hole 17, which also establishes such a throttling path, can correspondingly be omitted in the embodiment according to FIGS. 5 and 6.

One functional difference between the embodiment according to FIGS. 5 and 6 and the embodiment according to FIGS. 3 and 4 is the fact that the water pressure in the flow pipe 12 or at the inlet of the valve 11 is admitted to the piston 15 in the closed position shown in FIG. 5 essentially only on a cross section which corresponds to the opening cross section of the sleeve 18, while the pressure on the pressure side of the pump 8 or in the inlet line 9 acts on the entire cross section of the piston. The consequence of this is that at low temperatures below the transition temperature $T_s$, when the element 13 is unable to generate any force or any appreciable force to displace the piston 15 into its right-hand end position, a relatively high overpressure of water must be present in the flow pipe 12 or at the inlet of the valve 11 relative to the water pressure on the pressure side of the pump 8 or in the inlet line 9 when the valve 11 is to be opened by hydraulic forces. A reduced pressure difference is now sufficient for maintaining the open position.

The burner 3, the heat exchanger 1, as well as the pump 8 may be integrated in a compact, completely ready-to-install assembly unit. The shut-off valve 11 as well as the non-return valve 7 may be integrated in a valve unit which may be manufactured completely in advance. This is schematically indicated by the assembly units 21 and 22 in FIG. 1.

In the example shown, the element 13 operates as a compression spring, which switches over a valve due to an increase in length (or force of pressure) above the transition temperature $T_s$.

An arrangement in which the shortening of the element (or the accompanying increase in the pulling force) below the transition temperature $T_s$ is used for a setting stroke is also possible, in principle (especially in the case of a thermal working or setting element designed as a tension spring).

While specific embodiments of the invention have been shown and described in detail to illustrate the application of the principles of the invention, it will be understood that the invention may be embodied otherwise without departing from such principles.

What is claimed is:

1. A heating system for motor vehicles, comprising:
   a heat exchanger providing a radiating function;
   a fluidic heat carrier circuit, said heat exchanger being thermally coupled with said carrier circuit;
   an internal combustion engine first heat source;
   a second heat source in the form of a burner; and
   valve switch over means for connecting the heat carrier medium of the fluidic heat carrier circuit for directing the carrier medium past each of said first heat source and said second heat source, in a first state, and passing said heat carrier medium of said fluidic heat carrier circuit essentially only past said second heat source in a second state, said valve switch over means including a valve arrangement having a thermal setting element which is thermally coupled to said heat carrier medium disposed adjacent to said first heat source for setting said first state of said valve arrangement or for switching over from said first state to said second state upon reaching a threshold value temperature of the heat carrier medium.

2. A heating system according to claim 1, wherein said thermal setting element switches over said valve arrangement into said first state or maintains said valve arrangement in said first state above said temperature threshold value of said heat carrier medium.

3. A heating system according to claim 1, wherein said thermal setting element is a bimetal element.

4. A heating system according to claim 1, wherein said thermal setting element comprises a material with shape memory.

5. A heating system according to claim 1, further comprising a first pump feed means connected to said fluidic heat carrier circuit for feeding heat carrier medium arriving at said first heat exchanger via said first heat source to an inlet of said valve arrangement, said valve arrangement having an outlet;

a second pump feed means, said outlet being connected to an intake side of said second pump feed means, said second pump feed means having a pressure side connected to said second heat source, said intake side being connected to said outlet of said valve arrangement via a non-return valve, said non-return valve permitting essentially only flow to said second pump feed means, said inlet of said second pump feed means being connected in parallel with said outlet of said valve arrangement, to a heat carrier line, said heat carrier line forming part of said heat carrier circuit, said heat carrier line leading from an outlet side of said heat exchanger.

6. A heating system according to claim 5, wherein said valve arrangement includes a shut-off valve with a piston closing body and a piston working chamber, said closing body displaceably dividing said piston working chamber to form a shut-off valve inlet connection at one end and another axial end communicating with a pressure connection at a pressure side of said second feed pump means, said piston working chamber having an outlet with said closing body essentially closing and covering said outlet in a position pushed to an axial end of said piston working chamber and not restricting said outlet in an end position, pushed to an opposite axially end of said piston working chamber.

7. A heating system according to claim 5, wherein said thermal setting element comprises a helical compression spring arranged at an inlet of a shut-off valve of said valve arrangement, said helical compression spring assuming a shape for maintaining a closing body of said valve arrangement in a released position, in which said closing body does not restrict said outlet, or forcing said closing body into said released position with a strong force.

8. A heating system according to claim 5, wherein said closing body of said shut-off valve is formed as a differential piston, said piston having an active surface, to which fluidic pressure is admitted in the closed position in the opening direction of the closing body, is smaller than the active surface to which the fluidic pressure is admitted in the direction of the closed position.

9. A heating system according to claim 1, wherein said valve arrangement includes a shut-off valve including means for maintaining a throttled connection between said first heat source and said second heat source even in said second state, said throttled flow path leading immediately past said thermal setting element.

10. A heating system according to claim 4, wherein said material with shape memory is a shape memory alloy.

11. A heating system for motor vehicles, comprising:

a heat exchanger providing a radiating function;

a fluidic heat carrier circuit, said heat exchanger being thermally coupled with said carrier circuit;

an internal combustion engine first heat source;

a second heat source in the form of a burner; and valve switch over means for connecting the heat carrier medium of the fluidic heat carrier circuit for directing the carrier medium past each of said first heat source and said second heat source, in a first state, and passing said heat carrier medium of said fluidic heat carrier circuit essentially only past said second heat source in a second state, said valve switch over means including a valve arrangement with a material with shape memory forming a thermal setting element which is thermally coupled to said heat carrier medium disposed adjacent to said first heat source for setting said first state of said valve arrangement or for switching over from said first state to said second state upon reaching a threshold value temperature of the heat carrier medium.

12. A heating system according to claim 11, wherein said material with shape memory is a bimetal element.

13. A heating system according to claim 11, wherein said material with shape memory is a shape memory alloy (SMA).

14. A heating system for motor vehicles, comprising:

a heat exchanger providing a radiating function;

a fluidic heat carrier circuit, said heat exchanger being thermally coupled with said carrier circuit;

an internal combustion engine first heat source;

a second heat source in the form of a burner;

valve switch over means for connecting the heat carrier medium of the fluidic heat carrier circuit for directing the carrier medium past each of said first heat source and said second heat source, in a first state, and passing said heat carrier medium of said fluidic heat carrier circuit essentially only past said second heat source in a second state, said valve switch over means including a valve arrangement with a thermal setting element which is thermally coupled to said heat carrier medium disposed adjacent to said first heat source for setting said first state of said valve arrangement or for switching over from said first state to said second state upon reaching a threshold value temperature of the heat carrier medium;

a first pump feed means connected to said fluidic heat carrier circuit for feeding heat carrier medium arriving at said first heat exchanger via said first heat source to an inlet of said valve arrangement, said valve arrangement having an outlet; and a second pump feed means, said outlet being connected to an intake side of said second pump feed means, said second pump feed means having a pressure side connected to said second heat source, said intake side being connected to said outlet of said valve arrangement via a non-return valve, said non-return valve permitting essentially only flow to said second pump feed means, said inlet of said second pump feed means being connected in parallel with said outlet of said valve arrangement, to a heat carrier line, said heat carrier line forming part of said heat carrier circuit, said heat carrier line leading from an outlet side of said heat exchanger.

\* \* \* \* \*